United States Patent [19]

Rohr

[11] Patent Number: 5,171,646

[45] Date of Patent: Dec. 15, 1992

[54] FUEL CELL SYSTEM INCLUDING POROUS, PANEL TYPE SUPPORT AND PROCESS FOR PRODUCING THE SAME

[75] Inventor: Franz J. Rohr, Abtsteinach, Fed. Rep. of Germany

[73] Assignee: ABB Patent GmbH, Mannheim, Fed. Rep. of Germany

[21] Appl. No.: 683,262

[22] Filed: Apr. 10, 1991

[30] Foreign Application Priority Data

Apr. 10, 1990 [DE] Fed. Rep. of Germany ....... 4011506

[51] Int. Cl.[5] ............................................. H01M 8/04
[52] U.S. Cl. ...................................... 429/34; 429/30; 429/32; 429/38
[58] Field of Search .................. 429/30, 32, 34, 38

[56] References Cited

U.S. PATENT DOCUMENTS

| | | | |
|---|---|---|---|
| 4,510,212 | 4/1985 | Fraioli | 429/30 |
| 4,664,987 | 5/1987 | Isenberg | 429/38 |
| 4,666,798 | 5/1987 | Herceg | 429/30 |
| 4,937,152 | 6/1990 | Sato et al. | 429/30 |

*Primary Examiner*—Oiik Chaudhuri
*Assistant Examiner*—M. Nuzzolillo
*Attorney, Agent, or Firm*—Herbert L. Lerner; Laurence A. Greenberg

[57] ABSTRACT

A fuel cell system has a core in the form of a support having cavities passing therethrough and surfaces on which a multiplicity of fuel cells are disposed and mutually interconnected in series and in parallel by conductor tracks. The support is produced by an extrusion process. The conductor tracks and insulating layers are applied to the surfaces by screen printing and are permanently joined to the support by sintering. The fuel cells are assembled from individual layers and produced by a sheet casting and a screen printing process and are joined permanently to the support by adhesive sintering.

13 Claims, 2 Drawing Sheets

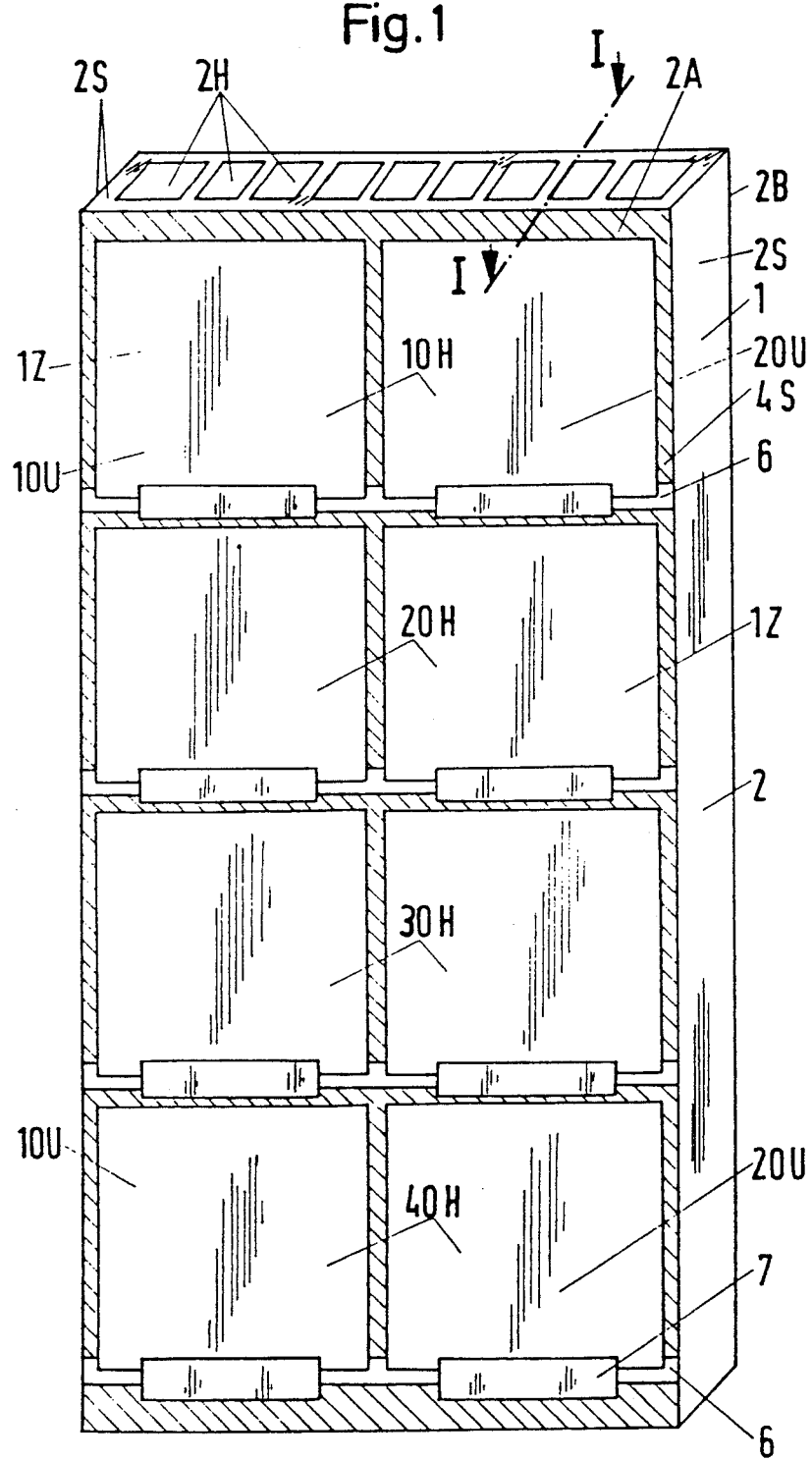
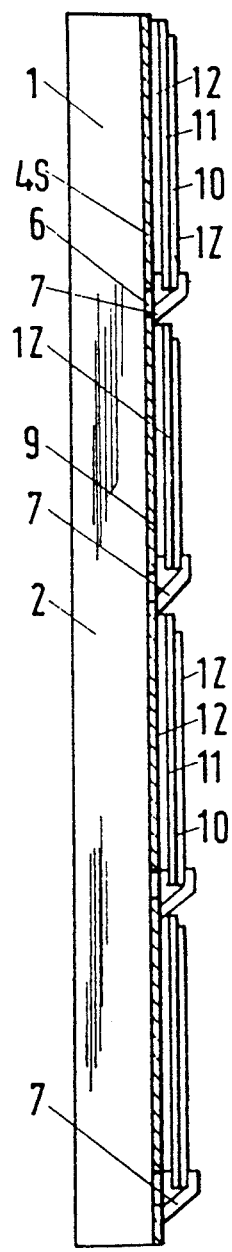

FUEL CELL SYSTEM INCLUDING POROUS, PANEL TYPE SUPPORT AND PROCESS FOR PRODUCING THE SAME

The invention relates to a fuel cell system including a porous, panel-type support having outwardly open cavities passing through it for conducting air or oxygen and having at least one fuel cell on each of its surfaces, as well as a process for producing such a fuel cell system.

For example, such a fuel cell system can be used as a current source. The informational document entitled "High Temperature Fuel Cells, Solid Electrolytes", Academic Press, N.Y., 1978, by F. J. Rohr, discloses a ceramic fuel cell containing a solid electrolyte which conducts oxygen ions as well as an anode and a cathode. That appliance makes it possible to convert the chemical energy of a fuel cell, for example of gasified coal, natural gas or hydrogen, directly into electrical energy by electrochemical oxidation with oxygen at temperatures over 800° C. The energy is converted with an efficiency which exceeds 50%. Fuel cell systems are known which are formed by combining several fuel cells and connecting them in series. Such systems are less suitable for continuous operation since they have high power losses at the high operating temperature as a consequence of an unfavorable sealing and connecting technique.

It is accordingly an object of the invention to provide a fuel cell system and a process for producing the same, which overcome the hereinafore-mentioned disadvantages of the heretofore-known methods and devices of this general type and which provide a system having an improved power density.

With the foregoing and other objects in view there is provided, in accordance with the invention, a fuel cell system, comprising a porous, panel-type support with two surfaces, the support having outwardly open cavities passing through the support for conducting air or oxygen therethrough, at least two rows of fuel cells disposed vertically underneath one another on the two surfaces, and a network of conductor tracks electrically conductingly interconnecting the rows.

In accordance with another feature of the invention, the rows are horizontal rows in which the fuel cells are interconnected in parallel, and the fuel cells are also disposed in vertical rows in which the fuel cells are interconnected serially.

In accordance with a further feature of the invention, the fuel cells are adjacent one another and have cathodes, and the cathodes of the adjacent fuel cells are electrically interconnected in parallel through the conductor tracks.

In accordance with an added feature of the invention, the fuel cells are adjacent one another and are each formed of a stack having a layer acting as anode, a layer acting as solid electrolyte and a layer acting as cathode on top of one another, the anodes of all of the fuel cells point outwardly, and there are provided electrically conducting layers each connecting a respective one of the anodes to an immediately adjacent fuel cell for parallel and/or serial interconnection.

In accordance with an additional feature of the invention, the cavities in the support extend over the entire length of the support, are adjacent one another and have longitudinal axes extending parallel to the two surfaces of the support and to one another, and the longitudinal axes of each two adjacent cavities are spaced apart by a distance of substantially between 1 and 2 cm.

In accordance with yet another feature of the invention, the support is manufactured from a corrosion-resistant porous ceramic material having a coefficient of thermal expansion of substantially from 10 to $11.10^{-6}$ degrees$^{-1}$ at 1000° C., the support has a porosity of substantially from 30 to 45% based on a theoretical material density, and the support is manufactured from a material selected from the group consisting of magnesium-aluminum spinel or a zirconium oxide being stabilized by adding 15 mol-% of at least one material selected from the group consisting of calcium oxide and/or magnesium oxide.

In accordance with yet a further feature of the invention, the support is extruded and the network of conductor tracks is formed on the two surfaces for serial and parallel interconnection of the fuel cells.

In accordance with yet an added feature of the invention, each of the cathodes is manufactured from strontium-doped lanthanum manganite ($La_{1-x}Sr_xMnO_3$) having a thickness of substantially from 0.2 to 1 mm, each of the layers acting as a solid electrolyte is manufactured from yttrium-doped zirconium oxide and has a thickness of substantially 0.05–0.25 $\mu m$, each of the layers acting as an anode are manufactured from a cermet in the form of nickel and yttrium-doped zirconium dioxide and are substantially from 50 $\mu m$ to 200 $\mu m$ thick, the conductor tracks of the network are produced from a perovskite mixed oxide selected from the group consisting of strontium-doped lanthanum chromite, magnesium-doped lanthanum chromite and calcium-doped lanthanum chromite as well as from a further layer selected from the group consisting of nickel oxide and nickel oxide/zirconium oxide, and the insulating layers are produced from a material selected from the group consisting of sintered glass ceramic and a spinel.

With the objects of the invention in view there is also provided a process for producing a fuel cell system, which comprises forming outwardly open air or oxygen conducting cavities completely through a porous, panel-type support having two surfaces, placing at least two rows of fuel cells vertically underneath one another on the two surfaces, electrically conductingly interconnecting the rows with a network of conductor tracks, producing layers acting as anodes, as solid electrolytes and as cathodes with a sheet casting and/or screen printing process, placing one of the layers acting as an anode, one of the layers acting as a solid electrolyte and one of the layers acting as a cathode above one another, and sintering the layers placed above one another at substantially from 1350° to 1450° C. for permanent joining.

With the objects of the invention in view there is additionally provided a process for producing a fuel cell system, which comprises producing a support with an extrusion process, applying insulating layers and electrical conductor tracks forming a network to two surfaces of the support by a screen printing process leaving given regions free of insulating layers and conductor tracks, sintering the support together with the applied layers and the conductor tracks at substantially from 1400° to 1550° C., coating the given regions of the two surfaces of the support for permanent joining to the fuel cells with one layer of an electrically conducting perovskite mixed oxide in the form of a material selected from the group consisting of strontium-doped lanthanum manganite La(Sr)MnO$_3$ and La(Ca)Cr$_x$MnyO$_3$ with a screen printing process, and placing the fuel cells in the given regions and sintering the fuel cells together with the support at substantially from 1300° to 1450° C. for permanent joining.

The fuel cell system can therefore be assembled from separately produced components. The construction of the fuel cell system makes it possible to manufacture the support together with the conductor tracks, which form a network for the parallel and serial interconnection of the fuel cells, and the necessary insulating layers, independently of the production of the fuel cells. In a separate working procedure, the plate-type fuel cells can be assembled from individual layers by means of sheet casting and screen printing and combined with the support after they have been manufactured.

Other features which are considered as characteristic for the invention are set forth in the appended claims.

Although the invention is illustrated and described herein as embodied in a fuel cell system and a process for producing the same, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawings.

FIG. 1 is a diagrammatic and partly sectional perspective view of a fuel cell system;

FIG. 4 is a partly sectional perspective view of the system according to FIG. 1.

DETAILED DESCRIPTION OF THE INVENTION

Figure 2:
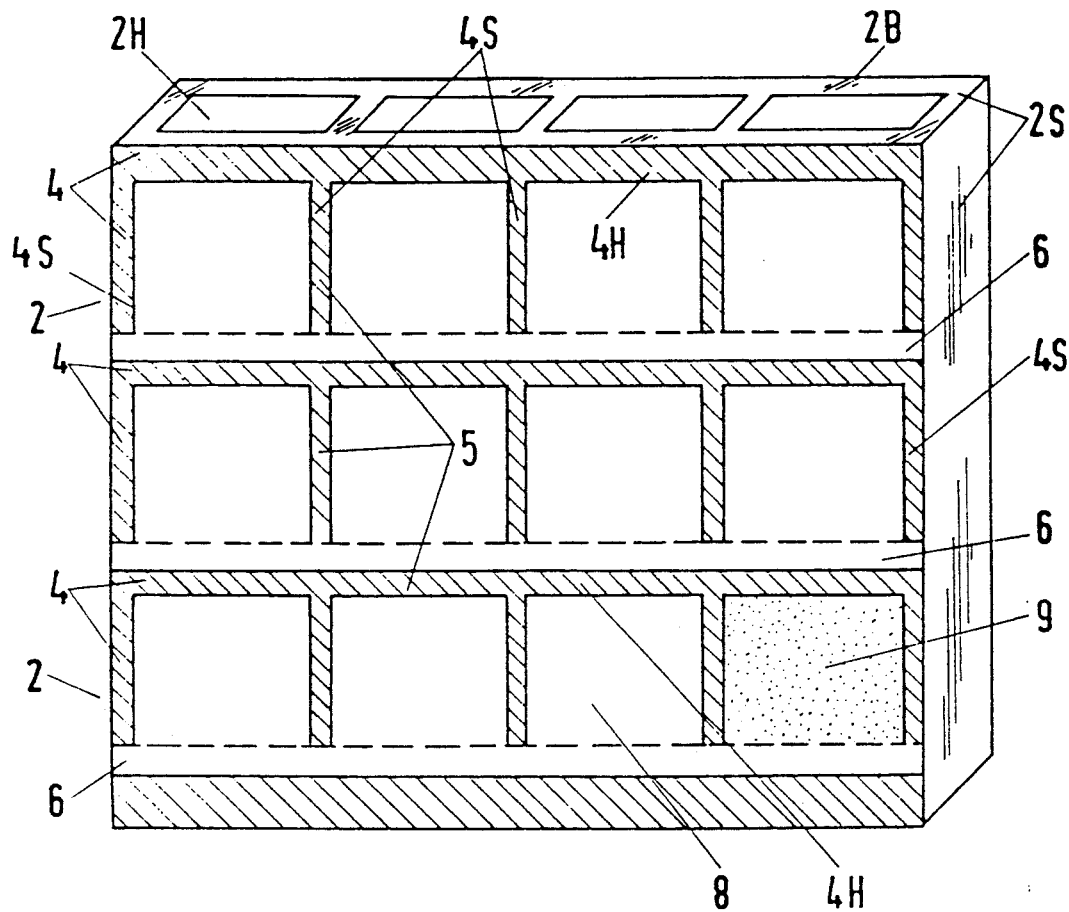
FIG. 2 is a view similar to FIG. 1 of a support for the fuel cell system.

Referring now to the figures of the drawing in detail and first, particularly, to FIG. 1 thereof, there is seen a fuel cell system 1 which is formed essentially of fuel cells 1Z and a support 2. The support 2 is of panel-type construction and is manufactured from a porous material. The interior of the support 2 has cavities 2H passing through it which are disposed at a specified distance from one another and which have longitudinal axes that extend parallel to one another and to two surfaces 2A and 2B of the support 2. The cavities 2H open outwardly at both ends of the support 2 so that air or oxygen can be passed through them. The support 2 shown in FIG. 1 is 20–50 cm long and 10–30 cm wide. Its thickness is 0.8–1.8 cm. Its cavities 2H have a cross section of $0.5 \times 1$ to $1.2 \times 2.4$ cm$^2$. The distance between two cavities 2H is 0.1–0.2 cm. The support 2 is produced by means of an extrusion process. The material used for manufacturing the support is composed of zirconium oxide which is stabilized with calcium oxide or magnesium oxide. The proportion of calcium oxide or magnesium oxide is approximately 15 mol-%, based on the total molar weight of the ceramic material being used. Instead of stabilized zirconium oxide, magnesium aluminum spinel (MgAl$_2$O$_4$) may also be used. Other temperature and corrosion-resistant ceramic materials may also be used, provided their coefficient of thermal expansion at 1000° C. is also in the vicinity of 10 to $11 \cdot 10^{-6}$ degrees$^{-1}$, as is the case for the above-mentioned materials. The support 2 has a porosity which is 30 to 45%, based on the theoretical density of the ceramic material. In order to achieve this porosity, pore formers are added to the extrusion compound. Foaming agents in the form of polyalcohols or carbonates are suitable for this purpose. The pore formers are thermally decomposed during the sintering of the ceramic to form the pores.

As can be seen by making reference to FIG. 2, the support 2 has conductor tracks 4 on its surface 2A which form a network 5. The conductor tracks 4 are of comb-type construction and are disposed at a specified distance from one another. Every horizontal section 4H of a conductor track 4 extends over the entire width of the support 2. Vertical conductor sections 4S that are disposed perpendicularly to each horizontal conductor section 4H are disposed at a specified distance from one another. This distance is 2–5 cm in the exemplary embodiment shown in this case. The width of the horizontal conductor track sections 4H is 3–6 mm, while the vertical conductor track sections 4S are 2–4 mm wide. The conductor tracks 4 are produced from a gas-tight, electrically conducting material in the form of a perovskite mixed oxide, for example from strontium-doped lanthanum chromite or magnesium or calcium-doped lanthanum chromite. In order to increase the electrical conductivity, the conductor tracks 4 are additionally coated with a non-illustrated 0.1–0.2 mm thick layer of nickel oxide/zirconium oxide or nickel oxide, which is reduced to metallic nickel during the subsequent fuel cell operation. Insulating layers 6 which separate the comb-type conductor tracks 4 disposed under one another from each other are produced from sintered glass ceramic or a spinel. The material is also gas-tight. The support 2 is produced by means of an extrusion process using the material described above. The conductor tracks 4 and the insulating layers 6 are applied to the surfaces 2A and 2B of the support 2 by means of a screen printing process. The support 2, together with the conductor tracks 4 and the insulating layers 6, is subsequently sintered at a temperature of 1400° to 1550° C. As a result, a permanent joint is achieved between the conductor tracks 4, the insulating layers 6 and the support 2.

Figure 3:
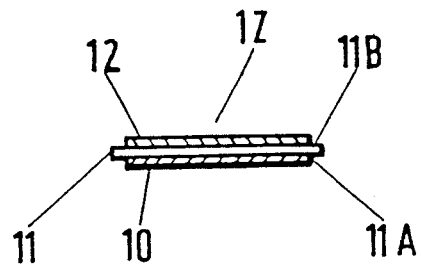
FIG. 3 is a longitudinal-sectional view taken along the line I—I in of FIG. 1, in the direction of the arrows.

As is shown in FIG. 3, every fuel cell 1Z is assembled from three layers 10, 11 and 12. The layer 10, which acts as an anode, is manufactured from nickel/zirconium dioxide cermet. It is porous and about 50 to 200 μm thick. The layer 11, which acts as a solid electrolyte, is manufactured from a gas-tight material. It has a thickness of between 50 and 200 μm. $(ZrO_2)_{0.9}(Y_2O_3)_{0.1}$ is used to form the layer 11. The layer 12, which assumes the function of a cathode, is produced from strontium-doped lanthanum manganite. It has a thickness of 0.2 to 1 mm. In order to produce the layers 10 to 12, suspensions of the corresponding materials are prepared. There is a possibility of first producing the layer 11, which acts as a solid electrolyte, by means of the sheet casting process and then applying the layer 10, which acts as an anode, to a first surface 11A and the layer 12, which acts as a cathode, to a second surface 11B of the layer 11, by means of screen printing. The preforms of the fuel cells 1Z that are manufactured in this way are then sintered at 1300° to 1400° C., in which process the layers 10, 11 and 12 are permanently joined to one another. After being manufactured, the fuel cells 1Z are disposed on the surfaces 2A and 2B of the support 2 and permanently joined to the latter. All of the fuel cells 1Z are joined to the support 2 in such a way that the cathodes 12 of the fuel cells 1Z are in direct contact with the support 2. The layers 10, which act as anodes, are disposed in such a way as to point upwards. The dimensions of the fuel cells 1Z are chosen in such a way that three outer peripheral regions of the layer 12 are disposed on the sections 4S and 4H of a comb-type conductor track 4. Due to the insulating layers 6 between each two comb-type conductor tracks 4, contact of the layers 12, which act as cathodes, with the sections 4H of the conductor track 4 disposed underneath, is avoided.

As FIG. 4 shows, the anode 10 of each fuel cell 1Z is connected through an electrically conducting layer 7 to the comb-type conductor track 4 which is disposed beneath the fuel cell 1Z. The layers 7 are each electrically connected to the section 4H of the conductor track 4 disposed underneath. The conductor layers 7 are manufactured from a cermet composed of nickel and zirconium dioxide.

The fuel cells 1Z belonging to horizontal rows 10H, 20H, 30H, 40H are interconnected in parallel with one another by the conductor tracks 4, while the fuel cells 1Z belonging to rows 10U, 20U are connected in series by the conductor layers 7. A permanent joining of the fuel cells 1Z to the support 2 is produced by adhesive sintering. For this purpose, as shown in FIG. 2, regions 8 between the conductor tracks 4 and the insulating layers 6 are coated with a porous layer 9 which is manufactured from an electrically conducting perovskite mixed oxide. The layers 9 are applied to the surfaces 2A and 2B of the support 2 by means of screen printing. Then, as shown in FIGS. 1 and 4, the fuel cells 1Z are disposed on the surfaces 2A and 2B of the support and permanently joined to the support 2 by sintering at a temperature of 1300° to 1450° C. In order to ensure that the air or the oxygen which is passed through the vacities 2H migrates through the support 2 to the fuel cells 1Z only in the vicinity of the cathodes 12 and cannot escape from the support 2 at other points, regions 2S of the support 2, which are not covered by gas-tight conductor tracks 4 nor by insulating layers 6 with a gas-tight structure, are coated with a glaze of sintered glass ceramic or enamel.

I claim:

1. A fuel cell system, comprising a porous, panel-type support with two surfaces, said support having outwardly open cavities passing through said support for conducting air or oxygen, at least two rows of fuel cells disposed on each of said two surfaces, said at least two rows being longitudinally stacked underneath one another and a network of conductor tracks electrically conductingly interconnecting said rows.

2. The fuel cell system according to claim 1, wherein said rows are horizontal rows in which said fuel cells are interconnected in parallel, and said fuel cells are also disposed in vertical rows in which said fuel cells are interconnected serially.

3. The fuel cell system according to claim 1, wherein said fuel cells are adjacent one another and have cathodes, and said cathodes of said adjacent fuel cells are electrically interconnected in parallel through said conductor tracks.

4. The fuel cell system according to claim 1, wherein said fuel cells are adjacent one another and are each formed of a stack having a layer acting as anode, a layer acting as solid electrolyte and a layer acting as cathode on top of one another, said anodes of all of said fuel cells point outwardly, and including electrically conducting layers each connecting a respective one of said anodes to an immediately adjacent fuel cell for at least one of parallel and serial interconnection.

5. The fuel cell system according to claim 1, wherein said cavities in said support extend over the entire length of said support, are adjacent one another and have longitudinal axes extending parallel to said two surfaces of said support and to one another, and the longitudinal axes of each two adjacent cavities are spaced apart by a distance of substantially between 1 and 2 cm.

6. The fuel cell system according to claim 1, wherein said support is manufactured from a corrosion-resistant porous ceramic material having a coefficient of thermal expansion of substantially from 10 to $11 \cdot 10^{-6}$ degrees$^{-1}$ at 1000° C., said support has a porosity of substantially from 30 to 45% based on a theoretical material density, and said support is manufactured from a material selected from the group consisting of magnesium-aluminum spinel and a zirconium oxide being stabilized by adding 15 mol-% of at least one material selected from the group consisting of calcium oxide and magnesium oxide.

7. The fuel cell system according to claim 1, wherein said support is extruded and said network of conductor tracks is formed on said two surfaces for serial and parallel interconnection of said fuel cells.

8. The fuel cell system according to claim 4, wherein each of said cathodes is manufactured from strontium-doped lanthanum manganite having a thickness of substantially from 0.2 to 1 mm, each of said layers acting as a solid electrolyte is manufactured from yttrium-doped zirconium oxide and has a thickness of substantially 0.05-0.25 $\mu$m, each of said layers acting as an anode are manufactured from a cermet in the form of nickel and yttrium-doped zirconium dioxide and are substantially from 50 $\mu$m to 200 $\mu$m thick, said conductor tracks of said network are produced from a perovskite mixed oxide selected from the group consisting of strontium-doped lanthanum chromite, magnesium-doped lanthanum chromite and calcium-doped lanthanum chromite as well as from a further layer selected from the group consisting of nickel oxide and nickel oxide/zirconium oxide, and said insulating layers are produced from a material selected from the group consisting of sintered glass ceramic and a spinel.

9. A fuel cell system, comprising a porous, panel-type support with two surfaces and outwardly open cavities passing through said support for conducting air or oxygen, and fuel cells each formed of a stack having a layer acting as an anode, a layer acting as a solid electrolyte and a layer acting as a cathode on top of one another, said fuel cells forming rows of fuel cells, at least two of said rows being disposed on said two surfaces adjacent one another and longitudinally stacked underneath one another, said anode layer of said fuel cells pointing outwardly away from said surfaces, a network of conductor tracks electrically interconnecting in parallel horizontal rows of said fuel cells and electrically contacting said cathodes of said fuel cells of each horizontal row, vertical rows of said fuel cells being interconnected serially by means of conducting layers connecting each said anodes of said fuel cells of said vertical row of an immediately adjacent fuel cell of said row.

10. The fuel cell system according to claim 9, wherein said cavities in said support extend over the entire length of said support, are adjacent one another and have longitudinal axes extending parallel to said two surfaces of said support and to one another, and the longitudinal axes of each two adjacent cavities are spaced apart by a distance of substantially between 1 and 2 cm.

11. The fuel cell system according to claim 9, wherein said support is manufactured from a corrosion-resistant porous ceramic material having a coefficient of thermal expansion of substantially from 10 to $11.10^{-6}$ degrees$^{-1}$ at 1000° C., said support has a porosity of substantially from 30 to 45% based on a theoretical material density, and said support is manufactured from a material selected from the group consisting of magnesium-aluminum spinel and a zirconium oxide being stabilized by adding 15 mol-% of at least one material selected from the group consisting of calcium oxide and magnesium oxide.

12. The fuel cell system according to claim 9, wherein said support is extruded and said network of conductor tracks is formed on said two surfaces for serial and parallel interconnected of said fuel cells.

13. The fuel cell system according to claim 9, wherein each of said cathodes is manufactured from strontium-doped lanthanum manganite having a thickness of substantially from 0.2 to 1 mm, each of said layers acting as a solid electrolyte is manufactured from yttrium-doped zirconium oxide and has a thickness of substantially 0.05–0.25 $\mu$m, each of said layers acting as an anode are manufactured from a cermet in the form of nickel and yttrium-doped zirconium dioxide and are substantially from 50 $\mu$m to 200 $\mu$m thick, said conductor tracks of said network are produced from a perovskite mixed oxide selected from eh group consisting of strontium-doped lanthanum chromite, magnesium-doped lanthanum chromite and calcium-doped lanthanum chromite as well as from a further layer selected from the group consisting of nickel oxide and nickel oxide/zirconium oxide, and said insulating layers are produced from a material selected from the group consisting of sintered glass ceramic and a spinel.

* * * * *